United States Patent [19]
Cleavenger

[11] 4,166,479
[45] Sep. 4, 1979

[54] BLIND LINER FOR SERVICE PIPES

[75] Inventor: Thomas H. Cleavenger, Chicago, Ill.

[73] Assignee: Cleavenger Associates, Inc., Chicago, Ill.

[21] Appl. No.: 914,604

[22] Filed: Jun. 12, 1978

Related U.S. Application Data

[63] Continuation-in-part of Ser. No. 794,962, May 9, 1977, abandoned.

[51] Int. Cl.$^2$ .............................................. F16L 55/18
[52] U.S. Cl. ....................................... 138/97; 285/15; 285/55
[58] Field of Search .......................... 138/97, 98, 109; 285/15, 55, 256, 338, DIG. 21; 425/11, 12

[56] References Cited

U.S. PATENT DOCUMENTS

| | | | |
|---|---|---|---|
| 2,543,954 | 3/1951 | Barber | 138/97 |
| 2,784,627 | 3/1957 | Mueller et al. | 138/97 |
| 2,926,701 | 3/1960 | Campbell | 285/55 |
| 3,578,360 | 5/1971 | Eliot | 285/55 |
| 3,696,447 | 10/1972 | McKown | 138/97 |

*Primary Examiner*—Richard R. Stearns

[57] ABSTRACT

An insertable plastic pipe liner and a blind locking service head including a means for installing the same in a damaged service pipe without removal or replacement thereof. The blind locking service head includes a pair of independent sealing gaskets arranged so as to permit pressure testing of the pipe liner after installation.

4 Claims, 5 Drawing Figures

BLIND LINER FOR SERVICE PIPES

SUMMARY OF THE INVENTION

This invention relates to an improvement over the assembly and construction shown and described in the co-pending patent application Ser. No. 794,962 now abandoned filed May 9, 1977. This application is a continuation in part of such earlier-filed patent application.

The invention relates to an assembly utilized in repairing without replacement a section of damaged service pipe, such as gas and water pipes, and includes a tool for the blind installation of the assembly in such service pipes.

Service pipes commonly run underground from a central main line into a building being serviced. These service pipes are generally of metallic construction and in time become defective and leaky due to corrosion and the like.

Liner assemblies of the type to which this invention relates eliminate the inconvenience and expense of digging or trenching to expose the defective pipe section which is located underground. The blind liner, or "by-pass" assembly as it is sometimes called, may be conveniently inserted through an accessible open end of the service pipe normally within the building being serviced, and sealed and locking in place without obstructing the service rendered through such pipe system.

An object of the present invention is to afford pressurized testing of the by-pass installation to assure and preserve the security of the same during normal use.

The invention will be best understood by reference to the accompanying drawings showing the preferred form of construction by which the objects of the invention are achieved, and in which.

Figure 1:
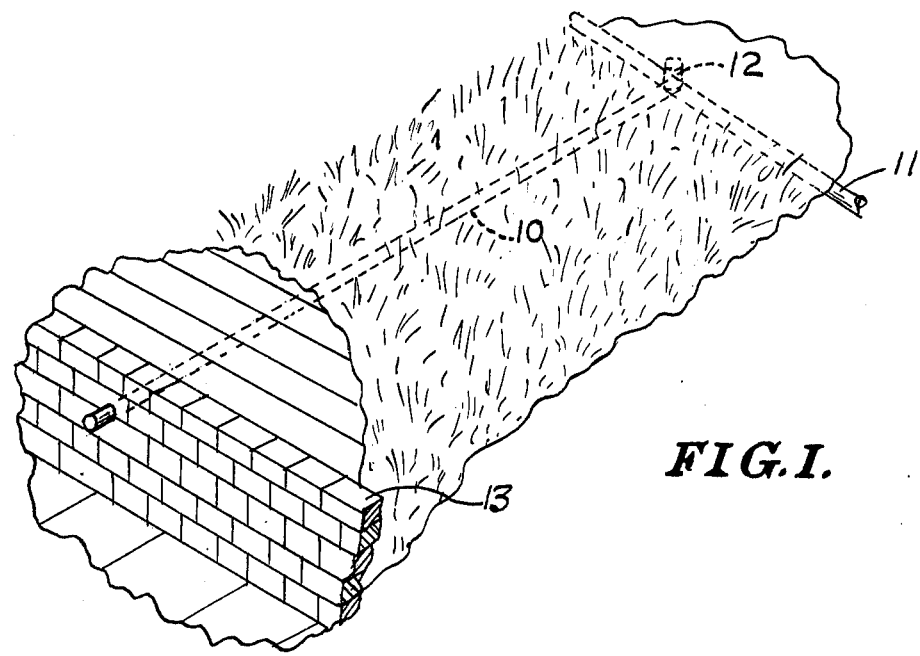
FIG. 1 is a fragmentary detailed sectional view of a typical service pipe installation.

Referring to the drawings, there is shown in FIG. 1 a typical service pipe installation. The service pipe 10, which usually is of a metallic construction, is connected to a street main 11 by a service tee 12 and runs underground through a building wall 13. The end of the service pipe 10 within the building may in turn be connected to suitable feeder lines in any acceptable manner. The service pipe 10 normally is adapted to be readily disconnected at the junction within the building between its inner end and such feeder lines in a manner well known in the art.

As the service pipe 10 is normally underground and is usually of a metallic material, in time it becomes corroded or broken and thus leaks and becomes defective.

Figure 3:
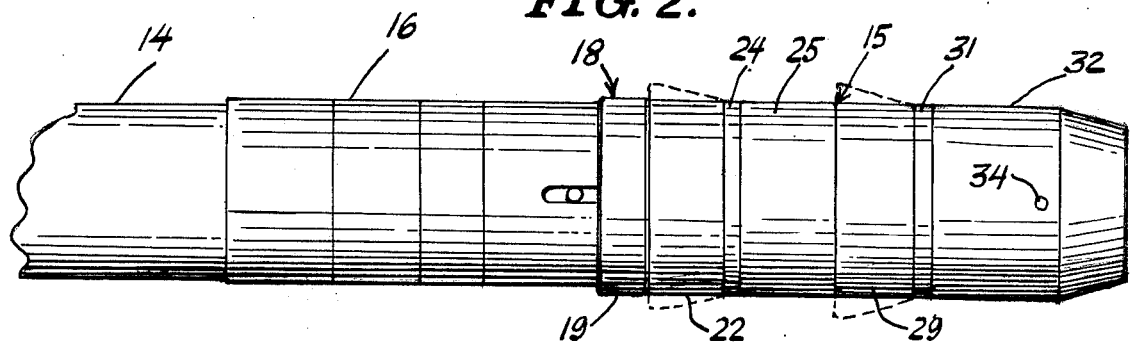
FIG. 3 is a fragmentary side elevational view of the blind service head utilized in the invention.
Figure 4:
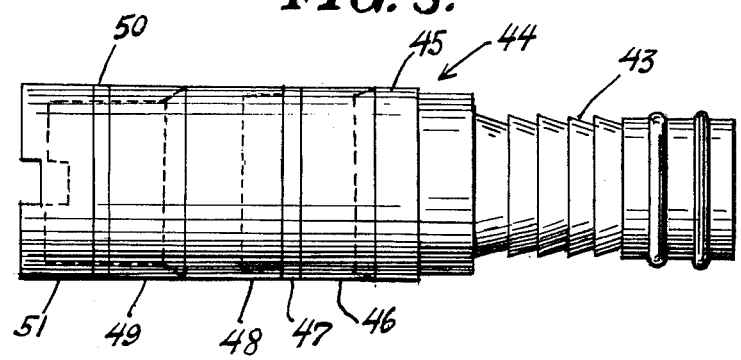
FIG. 4 is a side elevational view of the exposed service head as used in this invention.

The present invention is directed to a blind liner for the service pipe 10 and as such includes a liner pipe 14 adapted to have connected at opposite ends thereof a blind service head as shown in FIG. 3 and an exposed service head as shown in FIG. 4.

In the present invention the liner pipe 14 would be inserted into the service pipe 10 through the open end of the service pipe within the building and would extend to approximately the junction with the service tee 12. It is at this point that the liner pipe 14 must be blindly secured within the service pipe 10.

Figure 2:
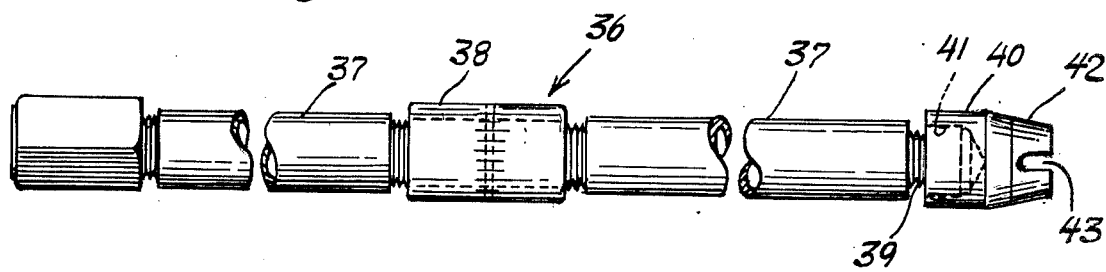
FIG. 2 is a fragmentary side elevational view of the installation tool used with this invention.
Figure 5:
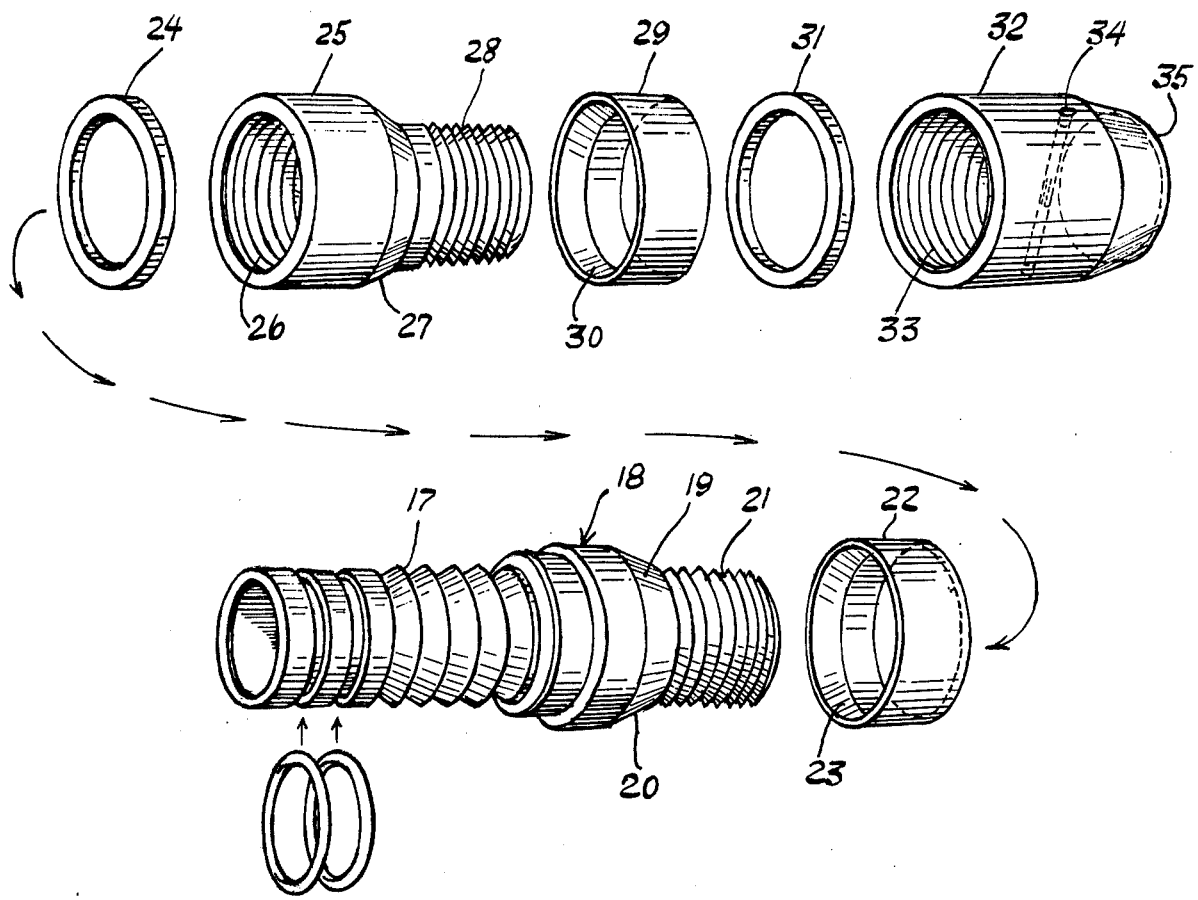
FIG. 5 is a perspective view of the structural components of the blind service head utilized in this invention shown in an exploded relationship.

To accomplish this, the liner pipe 14 is connected to a blind end fitting 15, as shown in FIG. 2. This blind end fitting 15 includes a compressible metallic cover sleeve 16 which is adapted to be placed over one end of the liner pipe end as the latter is frictionally inserted upon the elongated cylindrical stud 17 of the blind adapter head 18, as seen in FIG. 5. The blind adapter head 18 provides an annular flange 19 which includes a tapered shoulder 20, which in turn terminates into a threaded boss portion 21.

When the end of the liner pipe 14 has been secured to the blind adapter head 18, a sealing gasket 22 is placed upon the threaded boss portion 21 of the adapter head 18. This sealing gasket 22 terminates into an internal tapered shoulder 23, such as shown in FIG. 5.

The internal tapered shoulder 23 of the gasket 22 conforms to and is adapted to sit upon the shoulder 20 provided by the adapter head 18. A compression ring 24 is adapted to be freely journalled on the threaded boss 21 of the adapter head 18 so as to bear against the sealing gasket 22 as the same is forced upon the tapered shoulder 20 provided by the adapter head 18.

Adapted to be threaded upon the threaded boss portion 21 of the adapter head 18 is a compression head 25. This compression head 25 includes an internal threaded bore 26, as well as an external radial shoulder 27 which terminates into an axially extending threaded boss 28. A second sealing gasket 29 is adapted to be placed on the threaded boss 28 of the compression head 25 and it like the sealing gasket 22 provides an internal tapered shoulder 30 which is adapted to have facial abutment with the external shoulder 27 of the compression head 25. A compression ring 31 is adapted to be freely journalled on the threaded boss 28 so as to have facial abutment with the gasket 29 in the manner shown in FIGS. 3 and 5.

Adapted to be threaded upon the threaded boss portion 27 of the compression head 25 is a compression nut 32 which provides a center bore, a portion of which is threaded as at 33. The compression nut 32 is provided with axially aligned openings extending transversely to the center bore thereof, which openings in turn frictionally receive a pin 34. As shown in FIG. 5, the pin 34 will extend transversely with respect to the axis of the center bore formed in the compression nut 32.

When the blind adapter head 18 is thus assembled onto the one end of the liner pipe 14 in the manner shown in FIG. 3, the whole assembly is then inserted into the service pipe 10 which is to be repaired.

When the blind end fitting 15, together with the liner pipe 14, is positioned adjacent to the service tee 12 as shown in FIG. 1, it becomes necessary to lock and seal the same in such position.

To accomplish the locking and sealing of the liner pipe 14 and the blind end fitting 15, an elongated tool 36 is employed. This tool 36 consists of a plurality of pipe sections 37, preferably of approximately ten foot lengths joined together by suitable unions 38. The endmost pipe section 37 provides an axially extending stud 39 which is adapted to have threaded thereon a working head 40. As shown in FIG. 2, this working head 40 includes an internally threaded bore 41 and terminates at its opposite end into a tapered head 42 which is slotted as at 43, with the slot 43 extending coaxially of the threaded bore 41.

The working head 40, as well as the unions 38, are of a size to be freely projected through the liner pipe 14 and are so projected until the slot 43 of the working head 38 receives the pin 34 carried by the compression nut 32.

When the pin 34 of the compression nut 32 is captured within the slot 43 of the working head 40 and the tool axially rotated, the compression nut 32 will thread itself upon the threaded boss 28 of the compression head 25. In so doing the compression nut 32 will bear against the ring 31 and cause the second sealing gasket 29 to move over the tapered shoulder 27 of the compression head 25.

As the compression head 25 threadably receives the compression nut 32 it will be caused to thread itself upon the threaded boss portion 21 of the adapter head 18. This is effected purely through the increased frictional engagement of the first gasket 22 against the shoulder 20 of the adapter head 18 by axial movement of the compression head 25 against the compression ring 24 and first gasket 22.

By rotation of the compression head 25 upon the adapter head 18 the first gasket 22 will be caused to move over the shoulder 20 so as to project upon the annular flange 19 of the adapter head 18 into sealing contact with the inner wall surface of the service pipe 10 just as the second gasket 29 has been moved into sealing contact by the movement of the compression nut 32 upon the compression head 25. The opposite end of the liner pipe 14 has attached thereto an end fitting 44 which provides a liner pipe connecting stud 43 extending laterally from one side of a flange 45. A sealing gasket 46 is adapted to be moved over the flange 45 by axial movement of a compression ring 47 moved by the threadable engagement of a compression head 48 upon a threaded boss (not shown) provided by the end fitting 44. A second sealing gasket 49 is forced upon the compression head 48 by a second compression ring 50 when the compression nut 51 is threaded upon the compression head 48.

The end fitting 44 together with the liner pipe 14 may be placed in sealing contact with the service pipe 10 through the use of a connecting tool such as is shown in U.S. Pat. No. 2,926,701.

The blind service pipe adapter and assembly as heretofore described is more efficient than those known prior assemblies. As noted, the service pipe was normally of a metallic construction and through use the inner wall surface thereof became irregular and extremely pitted, making it nearly impossible to completely seal the service pipe from the liner pipe through the use of one sealing gasket. The improvement of two spaced apart sealing gaskets completely seals the interior of the liner pipe from the interior of the service pipe and thus permits a more efficient blind service repair than heretofore known. Each of the first sealing gaskets can be individually tested for sealing contact with the service pipe simply by backing off the respective compression nuts 32 and 51, which in effect would relieve the second sealing gaskets 29 and 49 without relieving the first sealing gaskets 22 and 46. By this arrangement a double safety check is provided the installer which is not available under known prior devices.

While I have illustrated and described the preferred form of construction for carrying my invention into effect, this is capable of variation and modification without departing from the spirit of the invention. I, therefore, do not wish to be limited to the precise details of construction as set forth, but desire to avail myself of such variations and modifications as come within the scope of the appended claims.

Having thus described my invention what I claim as new and desire to protect by Letters Patent is:

1. A fitting for a blind liner assembly for service pipes, with the fitting having fixed attachment to one end of the liner wherein the improvement comprises:
   (a) a hollow adapter having an externally threaded boss extending axially from one side thereof and of a diameter less than said adapter,
   (b) an annular shoulder extending between the different diameters of said adapter and said boss and facing away from said boss,
   (c) a first sealing gasket mounted on said adapter adjacent to said shoulder,
   (d) a hollow compression head having one end of a diameter equal to said adapter and internally threaded so as to be threaded upon said boss against said gasket so as to radially expand the same about said shoulder,
   (e) said compression head having its opposite end provided with an externally threaded boss of a diameter equal to said threaded boss provided by said adapter,
   (f) said compression head providing a second annular shoulder extending between the different diameters of its ends,
   (g) a second sealing gasket mounted on said annular shoulder provided by said compression head, and
   (h) a compression nut internally threaded so as to be threaded upon said threaded boss of said compression head against said second sealing gasket so as to radially expand the same about said shoulder provided by said compression head.

2. A fitting for a blind liner assembly as defined by claim 1 wherein said compression nut provides means internally thereof by which it may be threaded upon said threaded boss of said compression head by means projected internally of the blind liner assembly.

3. A fitting for a blind liner assembly as defined by claim 1 wherein the threading of said compression head upon said adapter results from frictional contact between said second sealing gasket and said compression head as said second gasket is radially expanded over said second shoulder provided by said head as said compression nut is threaded on one end of said compression head.

4. A fitting for a blind liner assembly as defined by claim 3 wherein said compression nut provides means internally thereof by which it may be threaded upon said threaded boss of said compression head by means projected internally of the blind liner assembly.

* * * * *

Disclaimer 4,166,479.—*Thomas H. Cleavenger*, Chicago, Ill. BLIND LINER FOR SERVICE PIPES. Patent dated Sept. 4, 1979. Disclaimer filed May 19, 1983, by the assignee, *Cleavenger Associates, Inc.*

Hereby enters this disclaimer to claims 1-4, inclusive of said patent.

[*Official Gazette August 16, 1983.*]